(12) United States Patent
Lin

(10) Patent No.: US 11,290,141 B2
(45) Date of Patent: Mar. 29, 2022

(54) PROTECTIVE COVER HAVING REPLACEABLE MALE PARTS AND PROTECTIVE COVER KIT

(71) Applicant: FRUITSHOP INTERNATIONAL CO., LTD., Zhonghe (TW)

(72) Inventor: Chin-Sheng Lin, Zhonghe (TW)

(73) Assignee: FRUITSHOP INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 16/923,639

(22) Filed: Jul. 8, 2020

(65) Prior Publication Data

US 2021/0351808 A1 Nov. 11, 2021

(30) Foreign Application Priority Data

May 8, 2020 (TW) .................................. 109205563

(51) Int. Cl.
*H04B 1/3888* (2015.01)
*A45C 11/00* (2006.01)
*A45F 5/00* (2006.01)
*H04B 1/3827* (2015.01)

(52) U.S. Cl.
CPC ............ *H04B 1/3888* (2013.01); *A45C 11/00* (2013.01); *A45F 5/00* (2013.01); *H04B 1/385* (2013.01); *A45C 2011/002* (2013.01); *A45F 2200/0516* (2013.01); *H04B 2001/3855* (2013.01)

(58) Field of Classification Search
CPC .................................................... H04B 1/3888
See application file for complete search history.

(56) References Cited

U.S. PATENT DOCUMENTS

| | | | | |
|---|---|---|---|---|
| 2005/0202854 | A1* | 9/2005 | Kortum | H01R 27/00 455/571 |
| 2015/0144755 | A1* | 5/2015 | Chien | F16M 11/16 248/231.81 |
| 2018/0003338 | A1* | 1/2018 | Scott | F16M 13/00 |
| 2018/0362062 | A1* | 12/2018 | Bacallao | B62B 3/1416 |

* cited by examiner

*Primary Examiner* — Hsinchun Liao
(74) *Attorney, Agent, or Firm* — Muncy, Geissler, Olds & Lowe, P.C.

(57) ABSTRACT

A protective cover is used for covering and fixing a mobile device selectively fixed to a fastener having a first or second female part. The protective cover includes an elastic protective-cover main body, a first rigid male part and a second rigid male part. The first and second rigid male parts to match first and second female parts of the fastener are selectively engaged with the elastic protective-cover main body. In addition, a protective cover kit is provided to include an elastic protective-cover main body, a rigid male part and a female-part carrier assembly. The female-part carrier assembly includes a universal female part and a female-part carrier. The universal female part, detachably connected with the female-part carrier, is universally used for detachably engaging the first or second connection part of the rigid male part. Thereupon, poor commonality between the male and female parts can be resolved.

16 Claims, 25 Drawing Sheets

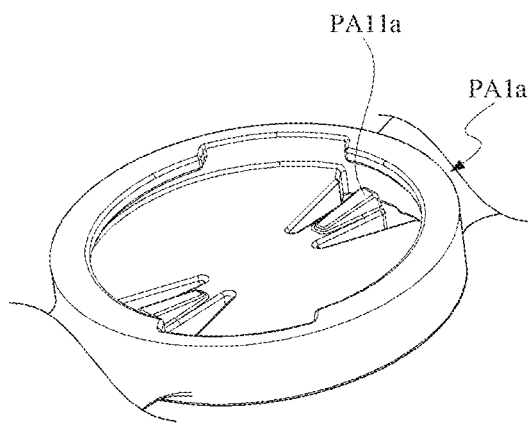
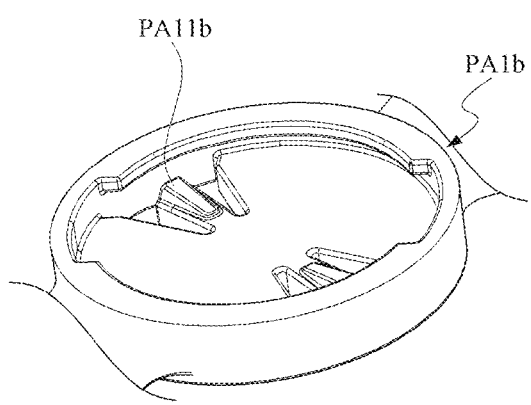
FIG.1(Prior Art)

PROTECTIVE COVER HAVING REPLACEABLE MALE PARTS AND PROTECTIVE COVER KIT

This application claims the benefit of Taiwan Patent Application Serial No.109205563, filed May 8, 2020, the subject matter of which is incorporated herein by reference.

BACKGROUND OF THE INVENTION

(1) Field of the Invention

The invention relates to a protective cover, and more particularly to a protective cover having replaceable male parts and a protective cover kit.

(2) Description of the Prior Art

With the rise of sports awareness and the development of smart phones, more and more people are used to wear smart phones to exercise. Though the smart phones can be used for recording contents of sports, calculating time of sports and/or playing music, yet exercise with a smart phone held at one hand is definitely inconvenient. In addition, a risk of slipping the smart phone off the hand due to sweating is always there.

Hence, in the art, some of sports accessories do provide specific spaces for resting the smart phones, and these sports accessories usually can be fixed to a carrier such as a human body, a bicycle or a fitness equipment.

Generally, each of the aforesaid sports accessories is furnished with a connector having a male part and a female part female. The male part is usually disposed at the smart phone, while the female part is disposed at the carrier. The male part can be detachably engaged with the female part, so that the smart phone can be fixed to the carrier. However, as described, the male part and the female part are paired to form the connector. In general, commonality does not exist to the male par and the female part across different brands. In other words, a male part cannot mate a female part of another connector carrying another brand. Definitely, lack of commonality in the male part and the female part does cause inconvenience to the users.

Referring to FIG. 1, two conventional female parts are shown together schematically in a perspective view. As shown, these two female parts PA1*a*, PA1*b* to pair different male parts are furnished with different assembling components PA11*a*, PA11*b*, respectively. As such, the female parts PA1*a*, PA1*b* can't be the replacement for each other. Obviously, the conventional sports accessories do have room for improvement.

SUMMARY OF THE INVENTION

In view of the aforesaid various problems at the male parts and the female parts for the conventional sports accessories, accordingly it is an object of the present invention to provide a protective cover having replaceable male parts and a protective cover kit that can resolve at least one of the aforesaid shortcomings in the art.

In the present invention, the protective cover having replaceable male parts is used for covering and fixing a mobile device, and the mobile device is selectively fixed to a fastener having a first female part or a second female part different from each other. The protective cover includes an elastic protective-cover main body, a first rigid male part and a second rigid male part.

The elastic protective-cover main body, having a lateral slot and an opening, is used for covering and fixing the mobile device, in which the lateral slot is larger in a longitudinal direction than the opening. The first rigid male part to match the first female part has a first connection part and a first engagement portion, and is detachably engaged with the lateral slot of the elastic protective-cover main body by protruding the first connection part out of the opening. The second rigid male part to match the second female part has a second connection part and a second engagement portion, and is detachably engaged with the lateral slot of the elastic protective-cover main body by protruding the second connection part out of the opening. When the fastener has the first female part, the first rigid male part is selected to be engaged with the elastic protective-cover main body, so as to be used for detachably engaging the first female part. When the fastener has the second female part, the second rigid male part is selected to be engaged with the elastic protective-cover main body, so as to be used for detachably engaging the second female part.

In one embodiment of the present invention, the elastic protective-cover main body includes a plurality of protrusive portions disposed at the lateral slot, and the first engagement portion is furnished with a plurality of first through holes; wherein, when the first rigid male part is engaged with the elastic protective-cover main body, the plurality of first through holes are inserted by the plurality of protrusive portions.

In one embodiment of the present invention, the elastic protective-cover main body includes a plurality of protrusive portions disposed at the lateral slot, and the second engagement portion is furnished with a plurality of second through holes; wherein, when the second rigid male part is engaged with the elastic protective-cover main body, the plurality of second through holes are inserted by the plurality of protrusive portion.

In one embodiment of the present invention, the first connection part to match the first female part is furnished with a plurality of first assembly holes.

In one embodiment of the present invention, the plurality of first assembly holes include two first horizontal assembly holes and two first longitudinal assembly holes, a first horizontal reference line is formed between the two first horizontal assembly holes, a first longitudinal reference line is formed between the two first longitudinal assembly holes, and the first horizontal reference line is perpendicular to the first longitudinal reference line.

In one embodiment of the present invention, the second connection part to match the second female part is furnished with a plurality of second assembly holes.

In one embodiment of the present invention, the plurality of second assembly holes include two second horizontal assembly holes and two second longitudinal assembly holes, a second horizontal reference line is formed between the two second horizontal assembly holes, a second longitudinal reference line is formed between the two second longitudinal assembly holes, and the second horizontal reference line is perpendicular to the second longitudinal reference line.

In one embodiment of the present invention, the first engagement portion has a plurality of first barbs for preventing the opening from being enlarged by the mobile device upon when the first rigid male part is engaged with the elastic protective-cover main body while in covering the mobile device.

In one embodiment of the present invention, the second engagement portion has a plurality of second barbs for preventing the opening from being enlarged by the mobile device upon when the second rigid male part is engaged with the elastic protective-cover main body while in covering the mobile device.

In one embodiment of the present invention, when the first rigid male part is engaged with the elastic protective-cover main body, the first connection part and the opening are fixed by structural interference.

In one embodiment of the present invention, when the second rigid male part is engaged with the elastic protective-cover main body, the second connection part and the opening are fixed by structural interference.

It is another object of the present invention to provide a protective cover kit for covering and fixing a mobile device, and for mounting the mobile device to a foreign object. The protective cover kit includes an elastic protective-cover main body, a rigid male part and a female-part carrier assembly. The elastic protective-cover main body is used for elastically covering and fixing the mobile device. The rigid male part has an engaging portion and a connecting portion, and is used for engaging the elastic protective-cover main body. The connecting portion is one of a first connection part and a second connection part.

The female-part carrier assembly includes a female-part carrier and a universal female part. The female-part carrier, used for defining a fixing space, is detachably fixed to the foreign object. The universal female part, detachably connected with the female-part carrier, is universally used for detachably engaging the first connection part or the second connection part of the rigid male part.

In one embodiment of the present invention, the rigid male part is engaged with the elastic protective-cover main body.

In one embodiment of the present invention, the female-part carrier includes a female-part carrier base, and the female-part carrier base is furnished with an accommodation room for accommodating the universal female part.

In one embodiment of the present invention, the female-part carrier base is further furnished with a female-part carrier engaging aperture, the female-part carrier further includes an attachment belt, the attachment belt has a first attachment layer and a second attachment layer, and the attachment belt penetrates through the female-part carrier engaging aperture to have the first attachment layer to be adhered onto the second attachment layer so as to define the fixing space.

In one embodiment of the present invention, the female-part carrier further includes at least one snap-in belt connected with the female-part carrier base, each of the at least one snap-in belt has at least one snap key and a plurality of snap incisions, and the at least one snap key is used for buckling at least one of the plurality of snap incisions so as to have the at least one snap-in belt to define the fixing space.

In one embodiment of the present invention, the universal female part includes a plurality of assembling components, the plurality of assembling component include a plurality of first assembling components for matching the first connection part and a plurality of second assembling components for matching the second connection part.

As stated above, since the protective cover having replaceable male parts provided by the present invention utilizes the first rigid male part or the second rigid male part to engage the female part of the fastener so as to detachably mount the elastic protective-cover main body to the fastener, thus, in comparison to the prior art, a relevant rigid male part can be determined to match the female part, and thereby the conventional problem of commonality in using the female part can be substantially resolved. Further, by having the first rigid male part of the present invention to be furnished with the first horizontal assembly holes and the first longitudinal assembly holes, and the second rigid male part to be furnished with the second horizontal assembly holes and the second longitudinal assembly holes, different assembly holes can be applied to match properly the assembling components of the female part, so that the mounting direction of the mobile device can be adjusted, and the use convenience can be greatly enhanced. In addition, the protective cover kit provided by the present invention utilizes the universal female part to resolve the conventional shortcoming in commonality upon the female part, such that detachable connection with any rigid male part can be feasible in accordance with the present invention.

All these objects are achieved by the protective cover having replaceable male parts and the protective cover kit described below.

BRIEF DESCRIPTION OF THE DRAWINGS

The present invention will now be specified with reference to its preferred embodiment illustrated in the drawings, in which:

FIG. 1 is a schematic perspective view of two conventional female parts;

DESCRIPTION OF THE PREFERRED EMBODIMENT

The invention disclosed herein is directed to a protective cover having replaceable male parts and a protective cover kit. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2:
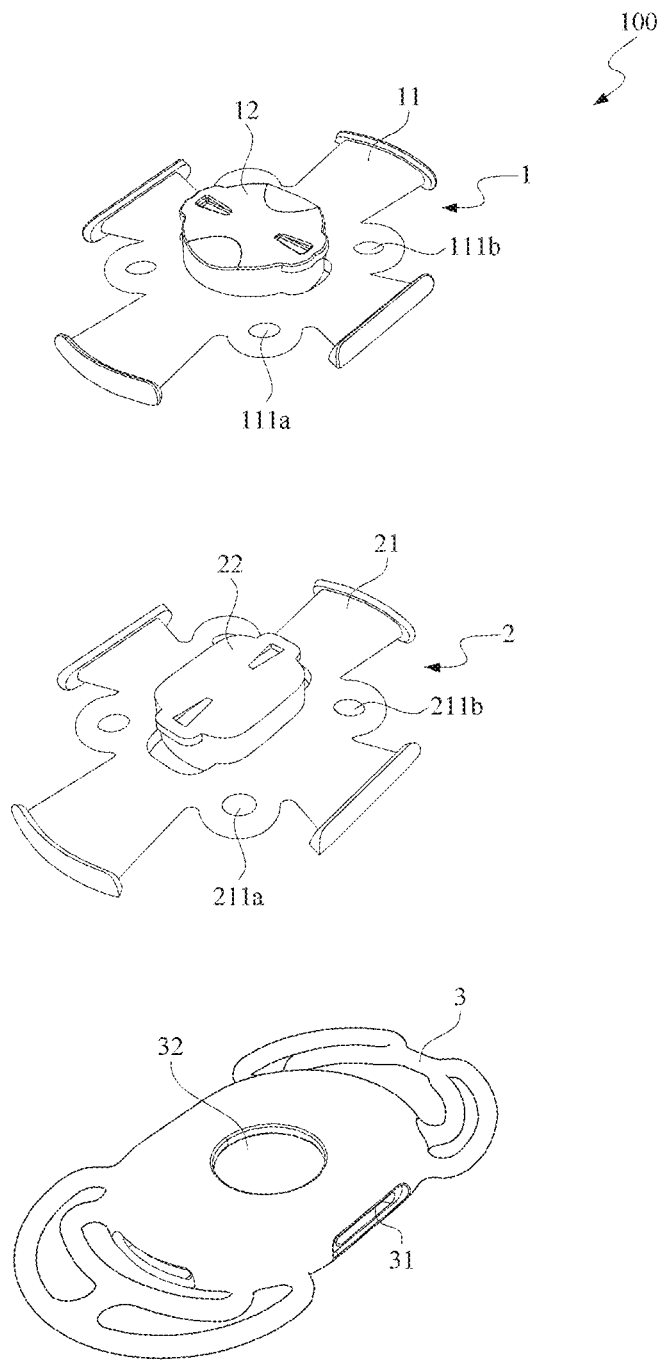
FIG. 2 is a schematic exploded view of the protective cover having replaceable male parts in accordance with a first embodiment of the present invention.
Figure 3:
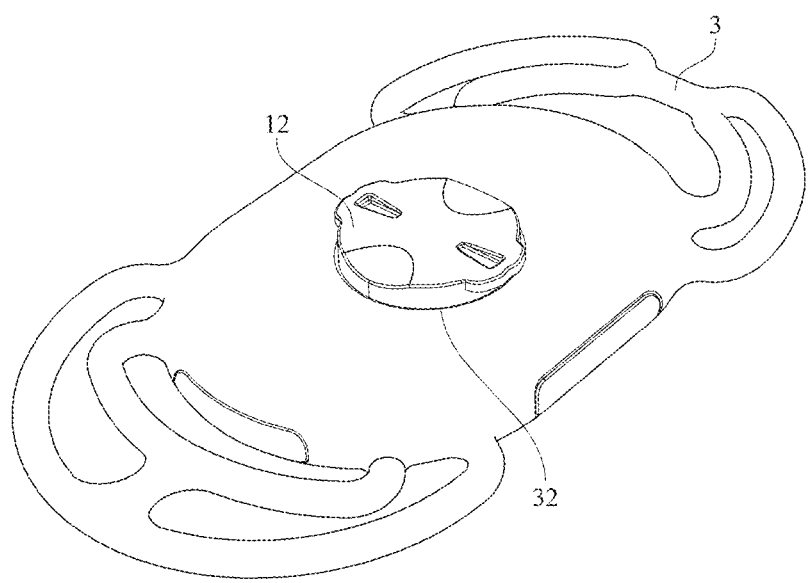
FIG. 3 is a schematic perspective view of FIG. 2 assembled with one of the male part.
Figure 4:
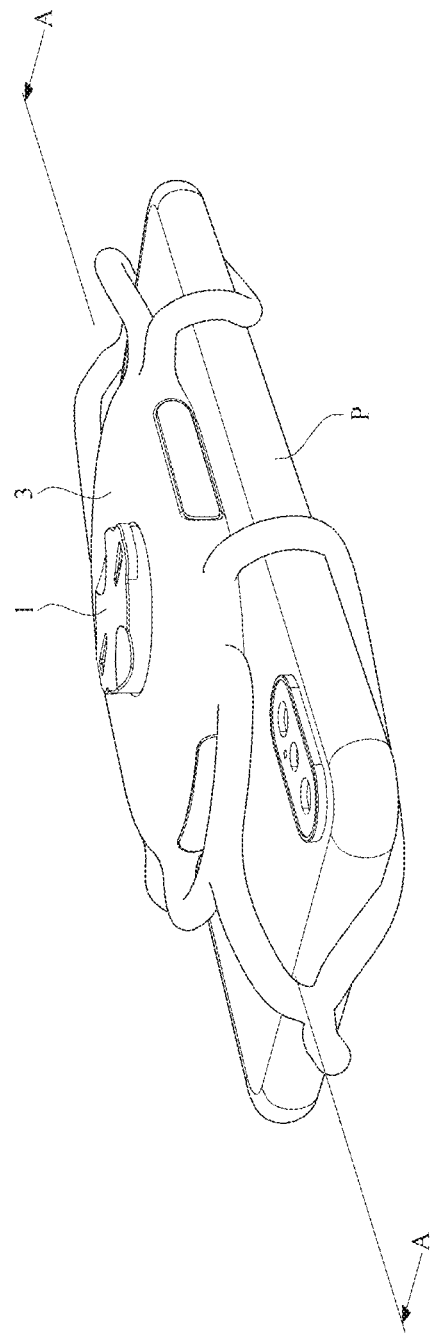
FIG. 4 is a schematic perspective view of the protective cover of FIG. 3 covering and fixing a mobile device.
Figure 5:
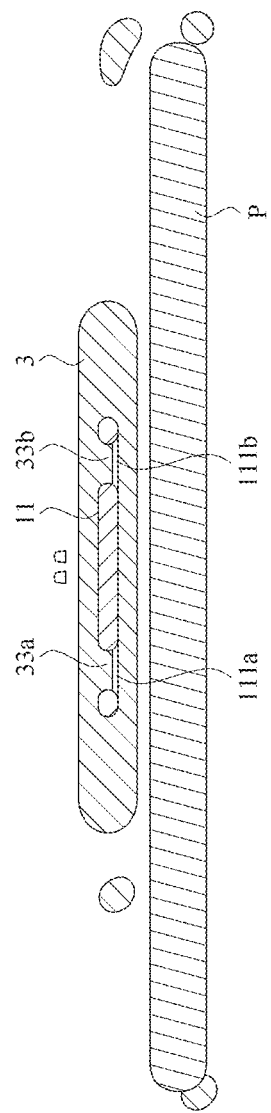
FIG. 5 is a schematic cross-sectional view of FIG. 4 along line A-A.
Figure 6:
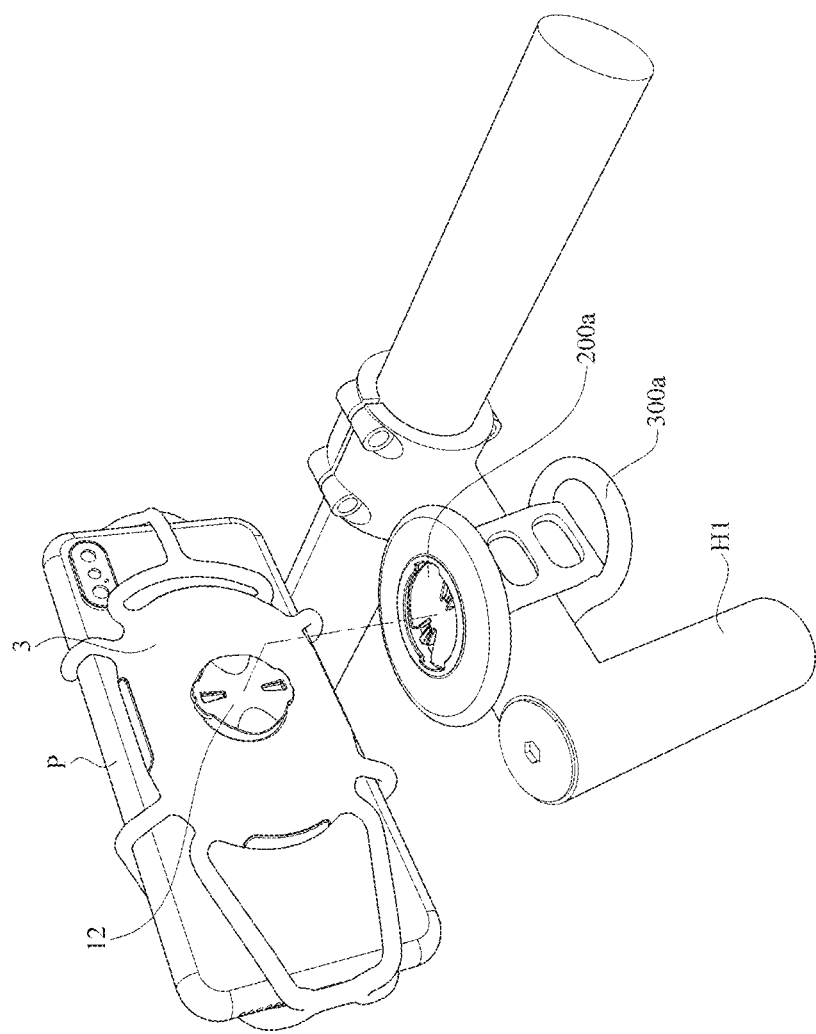
FIG. 6 demonstrates schematically the protective cover fixing the mobile device of FIG. 4 ready to engage a female part.
Figure 7:
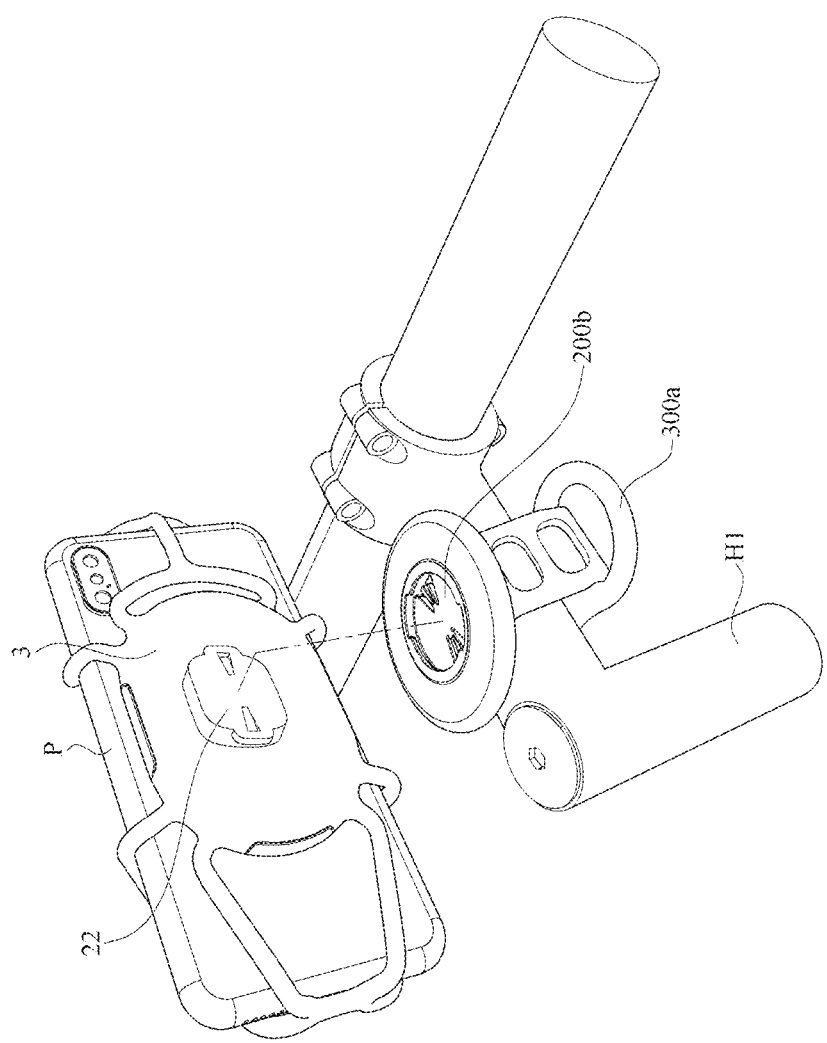
FIG. 7 demonstrates schematically another exemplary example of FIG. 6, in which a pair of the male part of FIG. 2 and another female part are implemented.

Refer to FIG. 2 through FIG. 7 together; where FIG. 2 is a schematic exploded view of the protective cover having replaceable male parts in accordance with a first embodiment of the present invention, FIG. 3 is a schematic perspective view of FIG. 2 assembled with one of the male part, FIG. 4 is a schematic perspective view of the protective cover of FIG. 3 covering and fixing a mobile device, FIG. 5 is a schematic cross-sectional view of FIG. 4 along line A-A, FIG. 6 demonstrates schematically the protective cover fixing the mobile device of FIG. 4 ready to engage a female part, and FIG. 7 demonstrates schematically another exemplary example of FIG. 6, in which a pair of the male part of FIG. 2 and another female part are implemented. As shown, the protective cover having replaceable male parts 100 is used for covering and fixing a mobile device P and particularly for selectively fixing the mobile phone P to a fastener 300a. The protective cover includes a first rigid male part 1, a second rigid male part 2 and an elastic protective-cover main body 3. The fastener 300a has a first female part 200a or a second female part 200b different from each other. More specifically, the first female part 200a and the second female part 200b are actually the female parts PA1a, PA1b described in the aforesaid background section.

The elastic protective-cover main body 3 having at least one lateral slot 31 and an opening 32 is used for covering the mobile device P. The lateral slot 31 has a size larger than the opening 32.

The first rigid male part 1, to match the first female part 200a, has at least one first engagement portion 11 and a first connection part 12, and can be detachably fitted to the elastic protective-cover main body 3 via engaging the lateral slot 31 to protrude the first connection part 12 out of the opening 32. In addition, the first connection part 12 and the opening 32 would form a structural interference to further secure the engagement.

The second rigid male part 2, to match the second female part 200b, has at least one second engagement portion 21 and a second connection part 22, and can be detachably engaged with the elastic protective-cover main body 3 through the engagement between the lateral slot 31 and the corresponding second connection part 22, so as to protrude the second connection part 22 out of the opening 32. In addition, the engagement of the second connection part 22 and the opening 32 can be secured through structural interference in between.

Either the first rigid male part 1 or the second rigid male part 2 can be applied to engage the elastic protective-cover main body 3. As shown in FIG. 3, the first rigid male part 1 is engaged with elastic protective-cover main body 3 to have the first connection part 12 to protrude outward through the opening 32. As shown in FIG. 4, the elastic protective-cover main body 3 is applied to cover and fix the mobile device P.

In this embodiment, the elastic protective-cover main body 3 includes a plurality of protrusive portions 33a, 33b disposed in the lateral slot 31. The first rigid male part 1 is furnished with a plurality of first through holes 111a, 111b (four shown in the figure, with two thereof labeled). In this embodiment, a quantity of the first through holes 111a, 111b is equal to that of the protrusive portions 33a, 33b.

When the first rigid male part 1 is engaged with the elastic protective-cover main body 3, the protrusive portions 33a, 33b would protrude toward, or even penetrate through, the corresponding first through holes 111a, 111b. Thus, when the elastic protective-cover main body 3 covers the mobile device P, since the protrusive portions 33a, 33b are extended into the first through holes 111a, 111b, a risk of breaking the opening 32 by the intrusive mobile phone P can be avoided. Then, the first connection part 12 of the first rigid male part 1 is applied to be detachably assembled to the first female part 200a of the fastener 300a, such that the mobile device P can be fixed to a foreign object H1. In this embodiment, the foreign object H1 is embodied as a bicycle faucet.

Further, in detail, by having the protrusive portions 33a, 33b to be inserted to the corresponding first through holes 111a, 111b, distortions and/or deformations of the lateral slot 31 and the opening 32 can be substantially reduced. Thereupon, deformations of the lateral slot 31 and the opening 32 could be much smaller than those of peripheral portions of the elastic protective-cover main body 3 covering the mobile device P.

As shown in FIG. 7, in the case that the fastener 300a is furnished with the second female part 200b, the second rigid male part 2 can be applied to the elastic protective-cover main body 3 for mating the second female part 200b. At this time, the second connection part 22 of the second rigid male part 2 can engage detachably the second female part 200b of the fastener 300a, and thereby the mobile device P can be fixed to a foreign object H1 mounting the fastener 300a. In addition, the second rigid male part 2 can be furnished with a plurality of second through holes 211a, 211b serving the same functions as those of the respective first through holes 111a, 111b, and thus details thereabout would be omitted herein. Namely, to meet the first female part 200a or the different second female part 200b, the first rigid male part 1 or the second rigid male part 2, respectively, should be applied to the elastic protective-cover main body 3 in advance.

Figure 8:
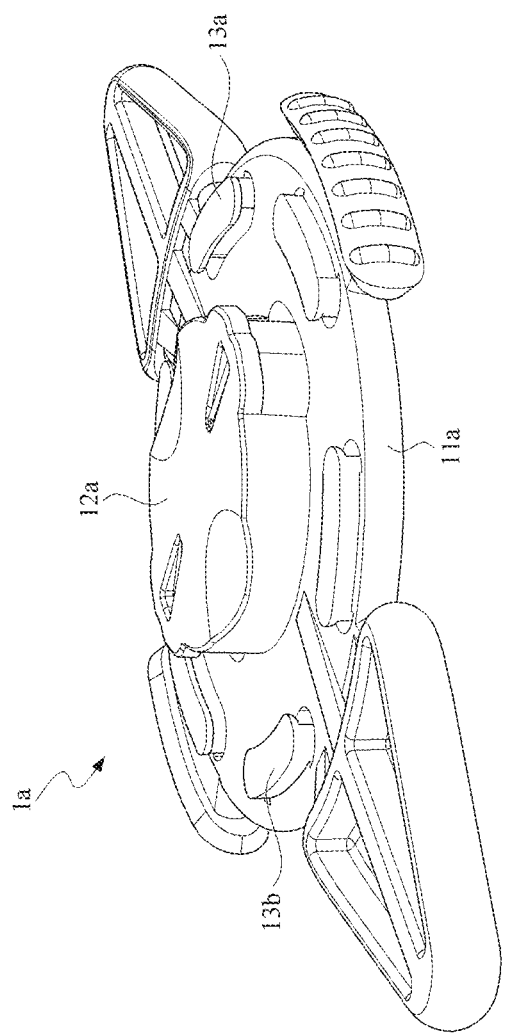
FIG. 8 is a schematic perspective view of a first rigid male part for a protective cover having replaceable male parts in accordance with a second embodiment of the present invention.
Figure 9:
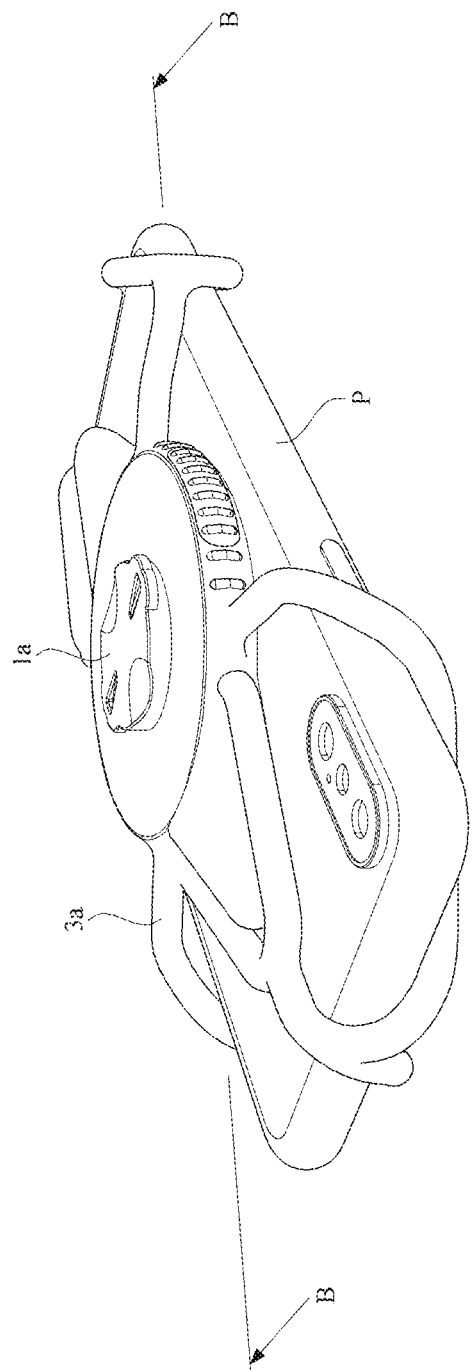
FIG. 9 is a schematic perspective view of the protective cover of FIG. 8 covering and fixing a mobile device.
Figure 10:
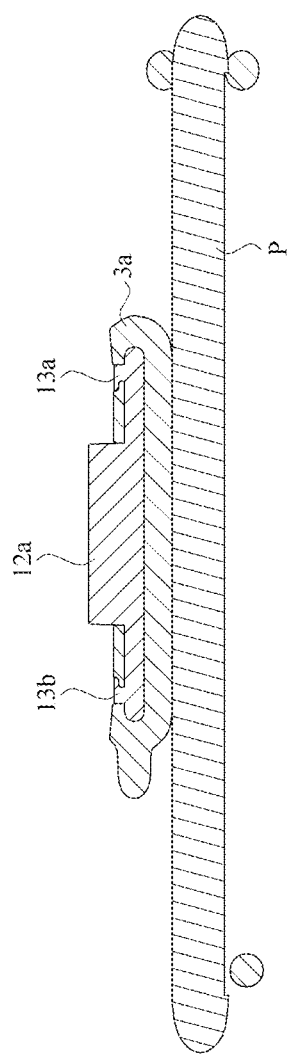
FIG. 10 is a schematic cross-sectional view of FIG. 9 along line B-B.

Then, refer to FIG. 8 through FIG. 10; where FIG. 8 is a schematic perspective view of a first rigid male part for a protective cover having replaceable male parts in accordance with a second embodiment of the present invention, FIG. 9 is a schematic perspective view of the protective cover of FIG. 8 covering and fixing a mobile device, and FIG. 10 is a schematic cross-sectional view of FIG. 9 along line B-B. In this embodiment, the first rigid male part 1a has a first engagement portion 11a, a first connection part 12a and a plurality of first barbs 13a, 13b (six shown in the figure, with two thereof labeled).

The first rigid male part 1a is engaged with the elastic protective-cover main body 3a firstly, and then the elastic protective-cover main body 3a can be applied to cover and fix the mobile device P. While the first rigid male part 1a is set to the the elastic protective-cover main body 3a, the first barbs 13a, 13b would deform inward to hook firmly the elastic protective-cover main body 3a, such that the opening can be prevented from being expanded to break by the mobile device P. Further, in detail, the inclusion of the first barbs 13a, 13b can reduce the deformations at the central portion of the elastic protective-cover main body 3a, such that the deformation at the central portion of the elastic protective-cover main body 3a would be far less than that at the peripheral portion of the elastic protective-cover main body 3 covering the mobile device P.

In this embodiment, though functions of the first barbs 13a, 13b have been described, yet the second rigid male part is not sketched in the figure. It shall be explained that a difference between the second rigid male part and the first rigid male part 1a is at the first connection part 12a and the second connection part, in which the second connection part of the second rigid male part is totally resembled to the second connection part 22 of the aforesaid first embodiment.

Figure 11:
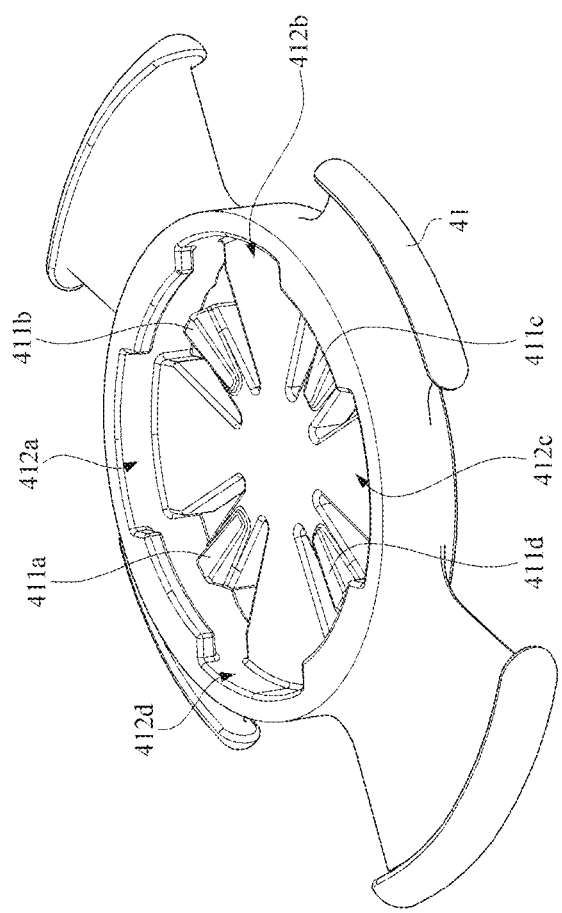
FIG. 11 is a schematic perspective view of a universal female part of a female-part carrier assembly for a protective cover kit in accordance with a third embodiment of the present invention.
Figure 12:
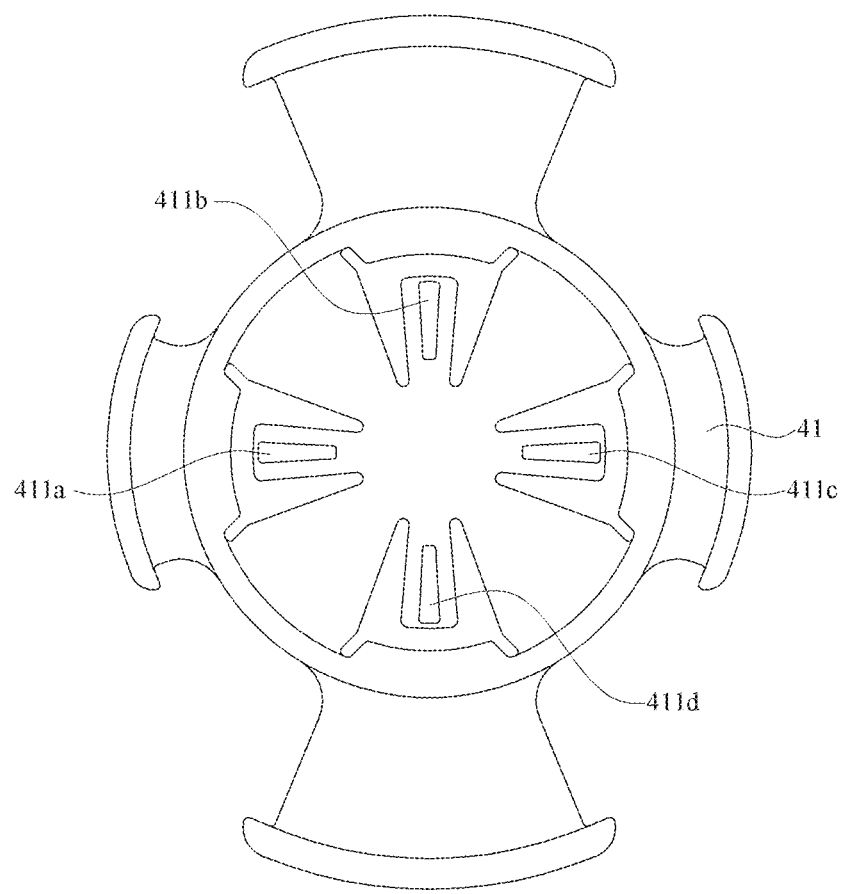
FIG. 12 is a schematic top view of FIG. 11.

Then, refer to FIG. 11 and FIG. 12; where FIG. 11 is a schematic perspective view of a universal female part of a female-part carrier assembly for a protective cover kit in accordance with a third embodiment of the present invention, and FIG. 12 is a schematic top view of FIG. 11. As shown, a universal female part 41 including a plurality of assembling components 411a, 411b, 411c, 411d, is furnished with a plurality of assembly grooves 412a, 412b, 412c, 412d.

Two of the assembling components 411a, 411b, 411c, 411d can be referred to the first rigid male parts 1 of the first embodiment, while another two thereof are referred to the second rigid male parts 2 of the first embodiment. Namely, the universal female part 41 can match different rigid male parts.

Figure 13:
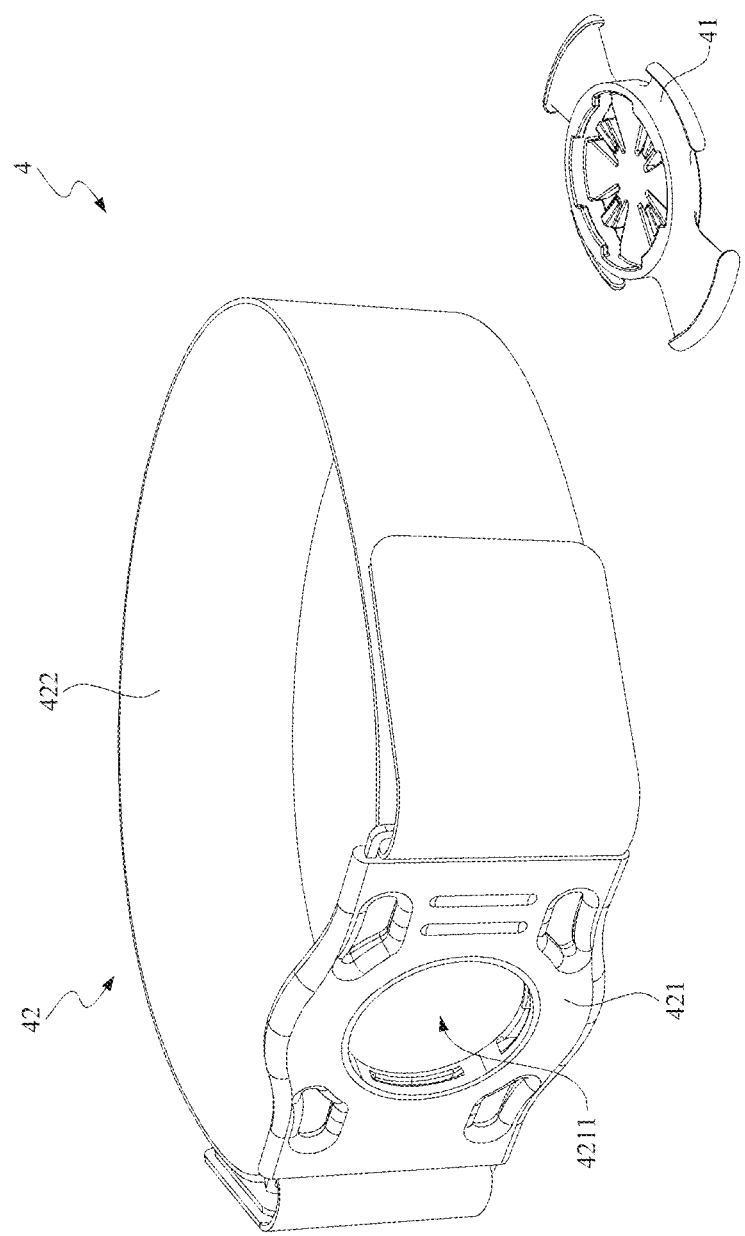
FIG. 13 is a schematic exploded view of the female-part carrier assembly for the protective cover kit in accordance with the third embodiment of the present invention.
Figure 14:
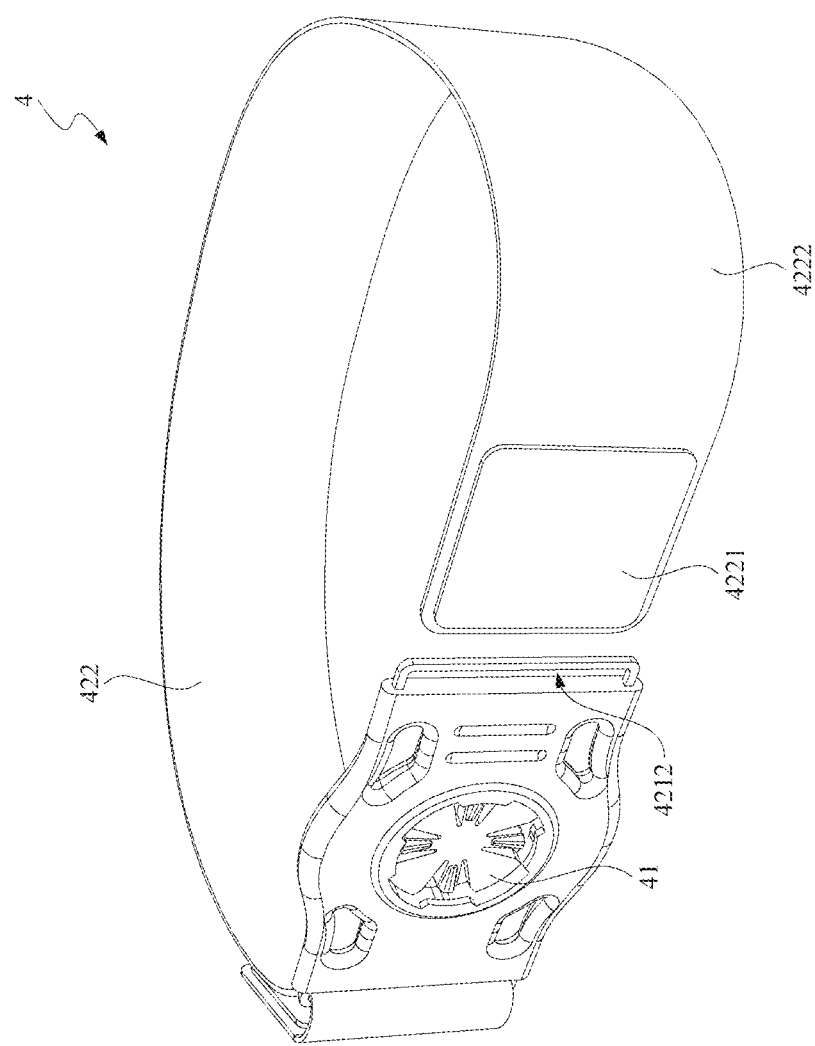
FIG. 14 is a schematic perspective view of FIG. 13.
Figure 15:
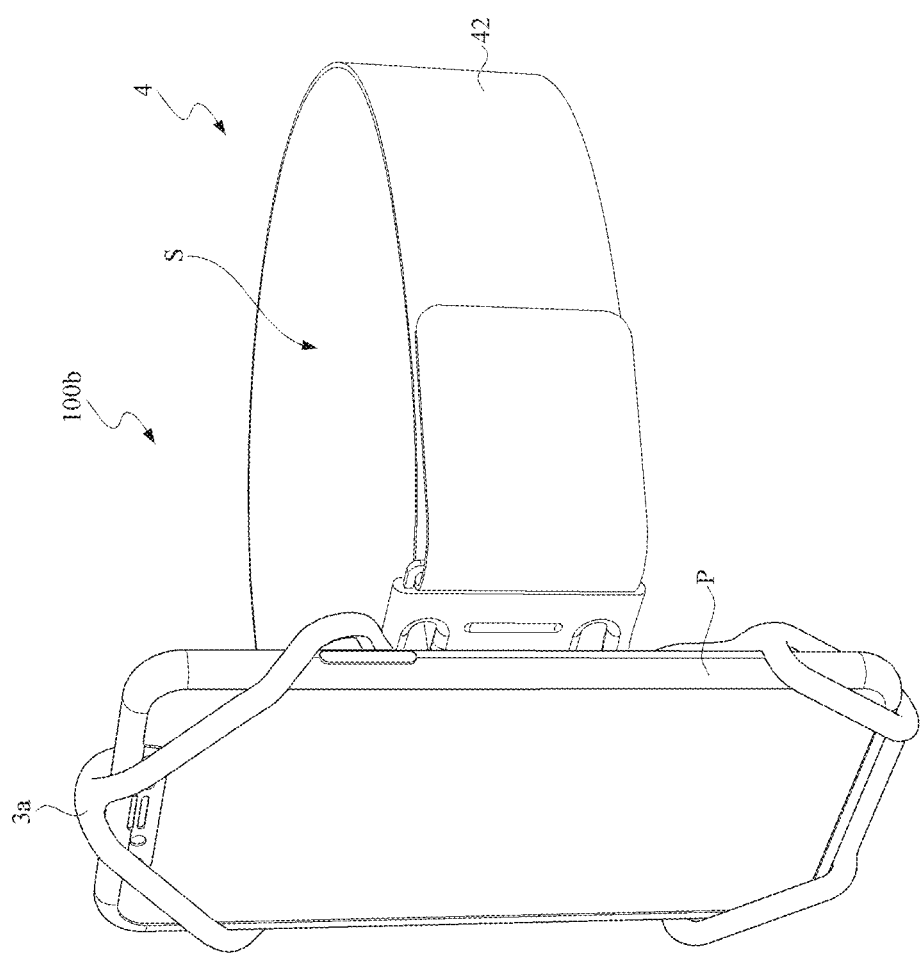
FIG. 15 demonstrates schematically a mobile device fixed by the protective cover kit of FIG. 14.

Refer to FIG. 11 through FIG. 15 together; where FIG. 13 is a schematic exploded view of the female-part carrier assembly for the protective cover kit in accordance with the third embodiment of the present invention, FIG. 14 is a schematic perspective view of FIG. 13, and FIG. 15 demonstrates schematically a mobile device fixed by the protective cover kit of FIG. 14. As shown, a protective cover kit 100b includes an elastic protective-cover main body 3a, a rigid male part and a female-part carrier assembly 4. In this embodiment, the protective cover kit 100b is equivalent to a combination of FIG. 9 and the female-part carrier assembly 4. In other word, the elastic protective-cover main body 3a of this embodiment is structurally resembled to that of FIG. 9, and the rigid male part of this embodiment (though hidden in the figure) is exactly the first rigid male part 1a of FIG. 9.

The female-part carrier assembly 4 includes an universal female part 41 and a female-part carrier 42. The female-part carrier 42 includes a female-part carrier base 421 and an attachment belt 422. The female-part carrier base 421 is furnished with an accommodation room 4211 and a female-part carrier engaging aperture 4212. The attachment belt 422 has a first attachment layer 4221 and a second attachment layer 4222.

The universal female part 41 is inserted into the accommodation room 4211 of the female-part carrier base 421. One end of the attachment belt 422 is connected with the female-part carrier base 421, while another end thereof penetrates through the female-part carrier engaging aperture 4212, and is then attached to the second attachment layer 4222 via the first attachment layer 4221. Thereupon, a fixing space S can be formed. Alternatively, two ends of the attachment belt 422 can be formed as an end furnished with the first attachment layer 4221 while another end thereof is furnished with a second attachment layer 4222. In addition, both ends of the female-part carrier base 421 are individually furnished with two corresponding female-part carrier engaging apertures 4212. Thus, two ends of the attachment belt 422 can be led to penetrate through the corresponding female-part carrier engaging apertures 4212, and then to adhere the corresponding second attachment layers 4222. As such, the fixing space S can be defined. In this disclosure, the first attachment layer 4221 and the second attachment layer 4222 can be opposing sides of Velcro.

The fixing space S is used for fixing a foreign object such as a human body, a bicycle, a female-part carrier or a fitness equipment. Practically, in this embodiment, the foreign object is a human body such as an arm, a waist or a leg.

Figure 16:
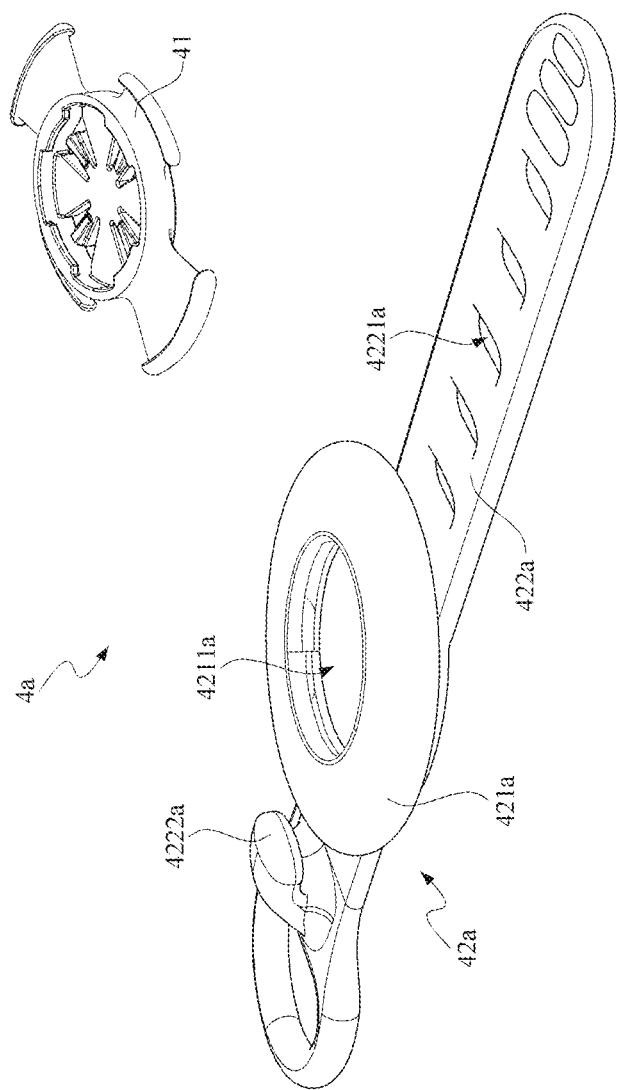
FIG. 16 is a schematic exploded view of a female-part carrier assembly of the protective cover kit in accordance with the fourth embodiment of the present invention.
Figure 17:
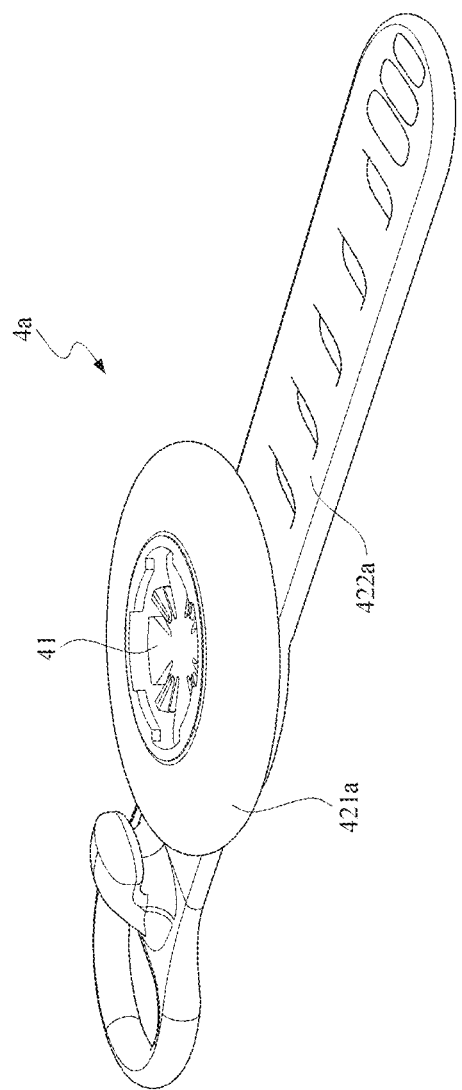
FIG. 17 is a schematic perspective view of FIG. 16.
Figure 18:
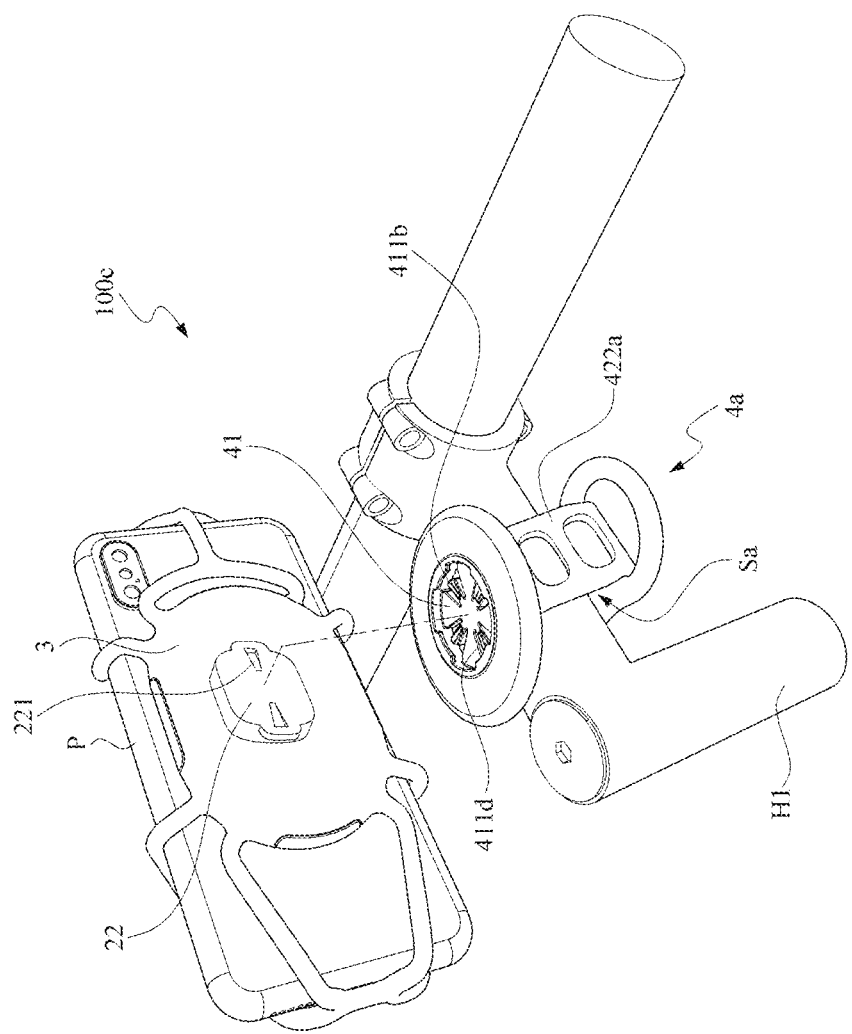
FIG. 18 demonstrates schematically the protective cover kit fixing the mobile device ready to be fixed to a foreign object in accordance with the fourth embodiment of the present invention.

Refer to FIG. 11, FIG. 12 and FIG. 16 through FIG. 18 together; where FIG. 16 is a schematic exploded view of a female-part carrier assembly of the protective cover kit in accordance with the fourth embodiment of the present invention, FIG. 17 is a schematic perspective view of FIG. 16, and FIG. 18 demonstrates schematically the protective cover kit fixing the mobile device ready to be fixed to a foreign object in accordance with the fourth embodiment of the present invention. As shown, a protective cover kit 100c includes an elastic protective-cover main body 3, a rigid male part and a female-part carrier assembly 4a. In this embodiment, the protective cover kit 100c can be a combination of the mobile phone P of FIG. 7 and the female-part carrier assembly 4a. Hence, the elastic protective-cover main body 3 of this embodiment and that of FIG. 7 are the same. In addition, the rigid male part is the second rigid male part 2 of FIG. 2, and the second connection part 22 is exposed in FIG. 7.

The female-part carrier assembly 4a includes a universal female part 41 and a female-part carrier 42a. The female-part carrier 42a includes a female-part carrier base 421a and a snap-in belt 422a. The female-part carrier base 421a is furnished with an accommodation room 4211a. The snap-in belt 422a has a snap key 4222a, and is furnished with a plurality of snap incisions 4221a.

The universal female part 41 is inserted in the accommodation room 4211a of the female-part carrier base 421a. The snap-in belt 422a connecting the female-part carrier base 421a includes plural snap incisions 4221a to be snapped through by the snap key 4222a, such that a fixing space A can be defined. In this embodiment, the snap-in belt 422a is structured to be an ordinary belt, and the fixing space Sa is used for fixing the female-part carrier base 421a to a foreign object H1. In this embodiment, the foreign object H1 can be a bicycle faucet or a wrist.

Figure 19:
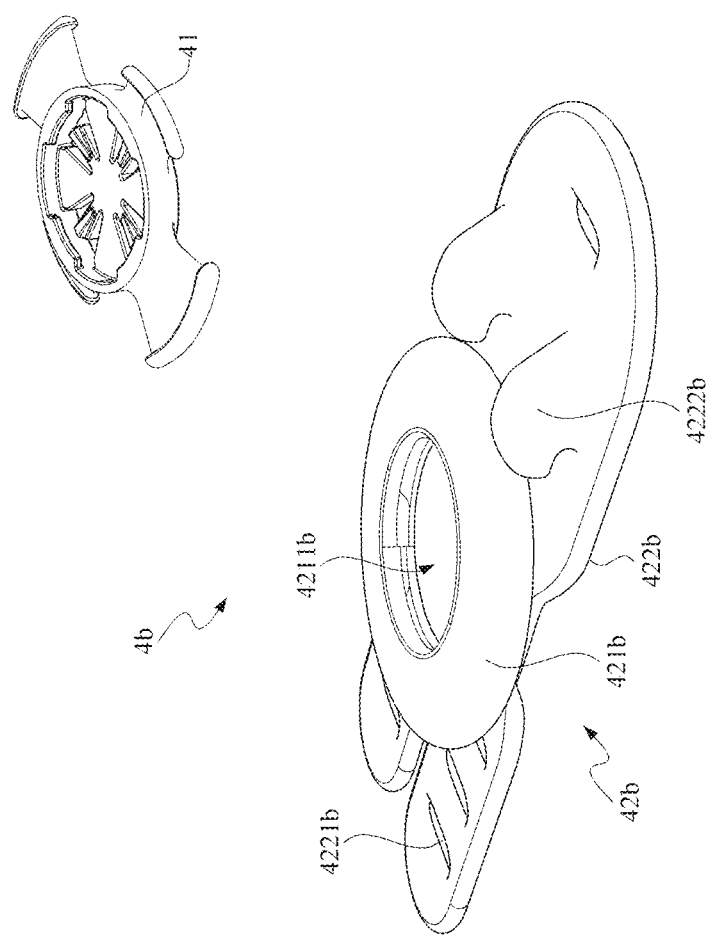
FIG. 19 is a schematic exploded view of a female-part carrier assembly of the protective cover kit in accordance with the fifth embodiment of the present invention.
Figure 20:
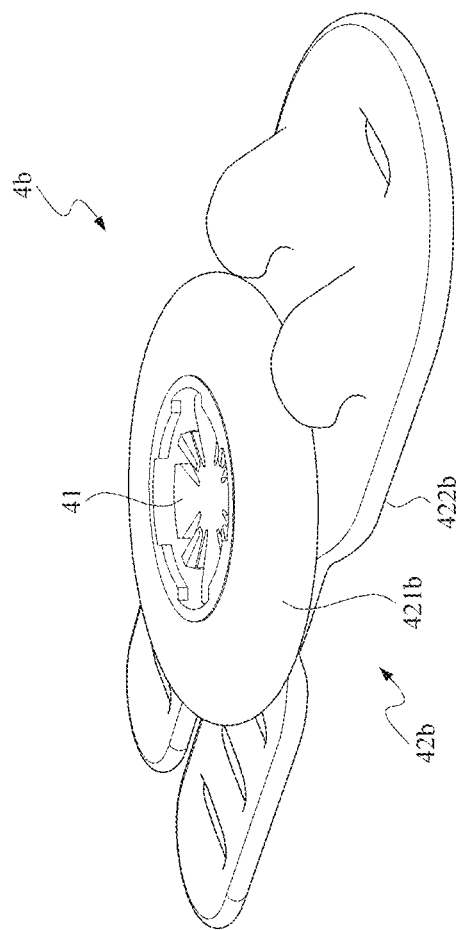
FIG. 20 is a schematic perspective view of FIG. 19.
Figure 21:
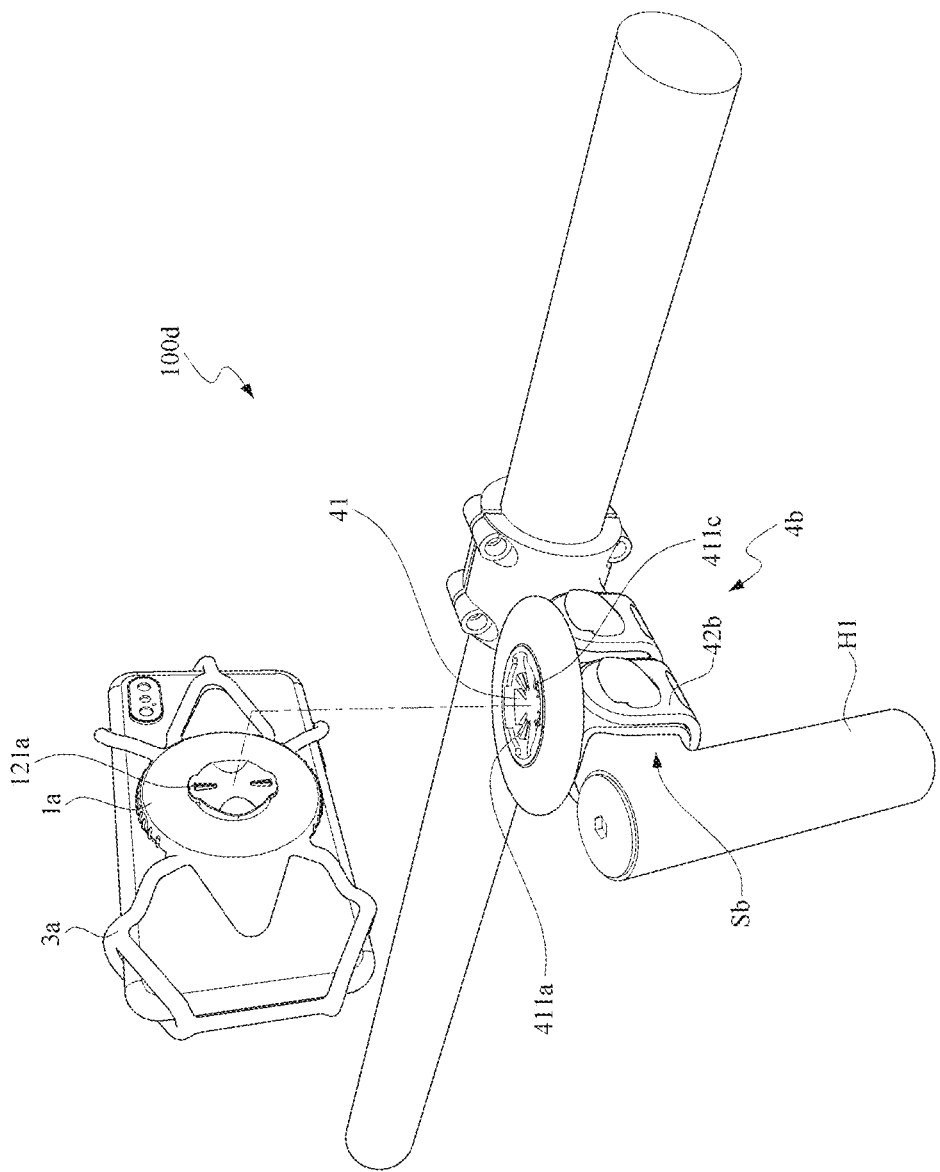
FIG. 21 demonstrates schematically the protective cover kit fixing the mobile device ready to be fixed to a foreign object in accordance with the fifth embodiment of the present invention.

Refer to FIG. 11, FIG. 12, and FIG. 19 through FIG. 21; where FIG. 19 is a schematic exploded view of a female-part carrier assembly of the protective cover kit in accordance with the fifth embodiment of the present invention, FIG. 20 is a schematic perspective view of FIG. 19, and FIG. 21 demonstrates schematically the protective cover kit fixing the mobile device ready to be fixed to a foreign object in accordance with the fifth embodiment of the present invention. As shown, a protective cover kit 100d includes an elastic protective-cover main body 3a, a rigid male part and a female-part carrier assembly 4b. In this embodiment, the protective cover kit 100d can be seen as an assembly to mount the mobile phone P of FIG. 9 to the female-part carrier assembly 4, Thus, the elastic protective-cover main body 3a of this embodiment is the same as that of FIG. 9, and the rigid male part thereof is the first rigid male part 1a of FIG. 9.

The female-part carrier assembly 4b includes a universal female part 41 and a female-part carrier 42b. The female-part carrier 42b includes a female-part carrier base 421b and two snap-in belts 422b. The female-part carrier base 421b is furnished with an accommodation room 4211b. Each of the snap-in belts 422b has a snap key 4222b, and is furnished with a plurality of snap incisions 4221b.

The universal female part 41 is inserted into the accommodation room 4211b of the female-part carrier base 421b. Each of the two snap-in belts 422b is connected with the female-part carrier base 421b, and utilizes individual snap key 4222b to buckle one of the snap incisions 4221b, such that a fixing space Sb can be defined. Each of the snap-in belts 422b is structured to be an ordinary belt. The fixing space Sb is used for fixing the female-part carrier base 421b to a foreign object H1, and the foreign object H1 of this embodiment is a bicycle faucet.

Since the universal female part 41 includes assembling components 411a, 411b, 411c, 411d, thus the universal female part 41 can be used for universally assembling the rigid male part. By comparing the fourth embodiment and the fifth embodiment, the assembly holes of the rigid male part in the fourth embodiment (i.e., the second assembly holes 221 of the second rigid male part 2) can match the assembling components 411b, 411d of the universal female part 41, while the assembly holes of the rigid male part in the fifth embodiment (i.e., the first assembly holes 121a of the first rigid male part 1a) can match the assembling components 411a, 411c of the universal female part 41.

Figure 22:
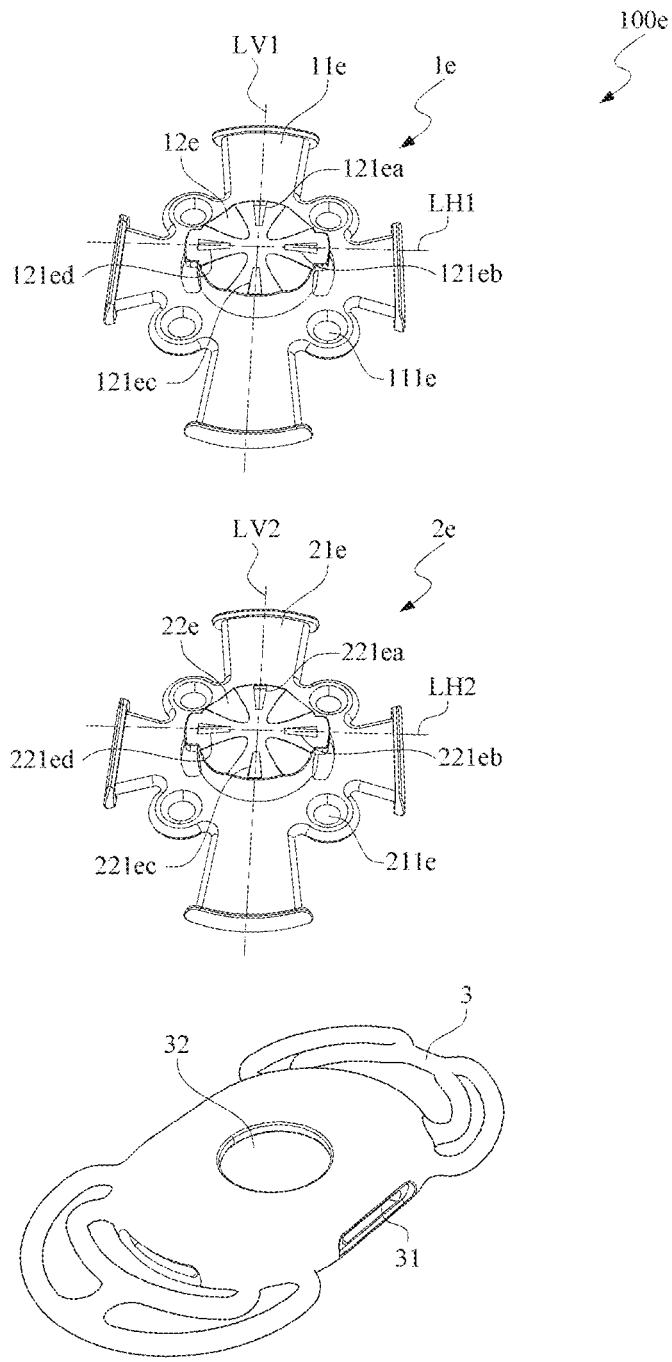
FIG. 22 is a schematic exploded view of the protective cover having replaceable male parts in accordance with the sixth embodiment.
Figure 23:
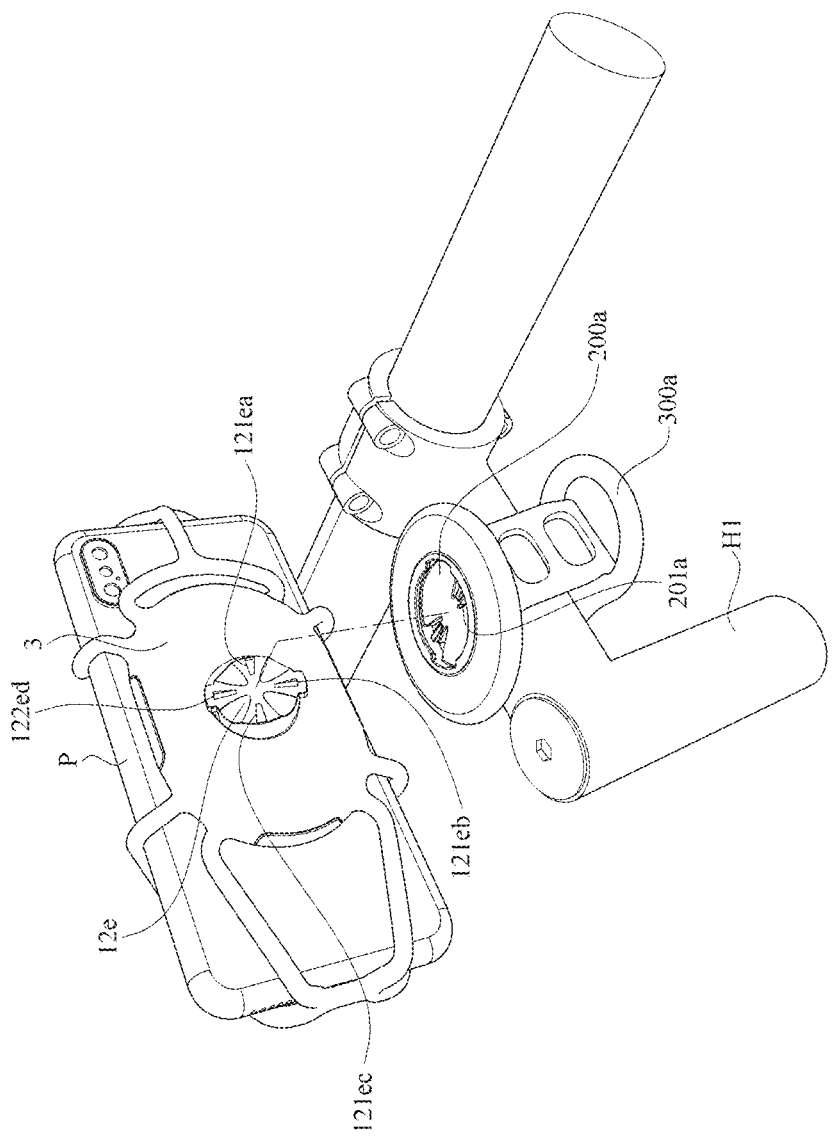
FIG. 23 is a schematic exploded view of the protective cover assembled with one of the male parts and a female part in accordance with the sixth embodiment of the present invention.
Figure 24:
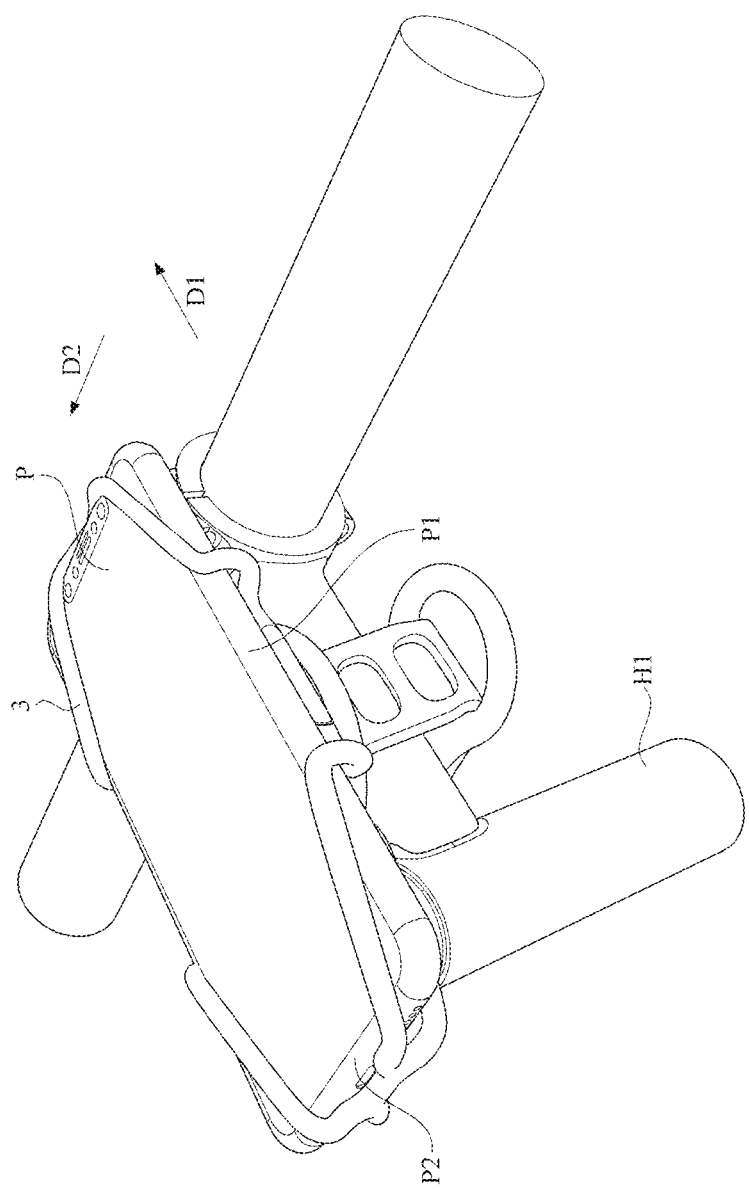
FIG. 24 is a schematic perspective view of FIG. 23.
Figure 25:
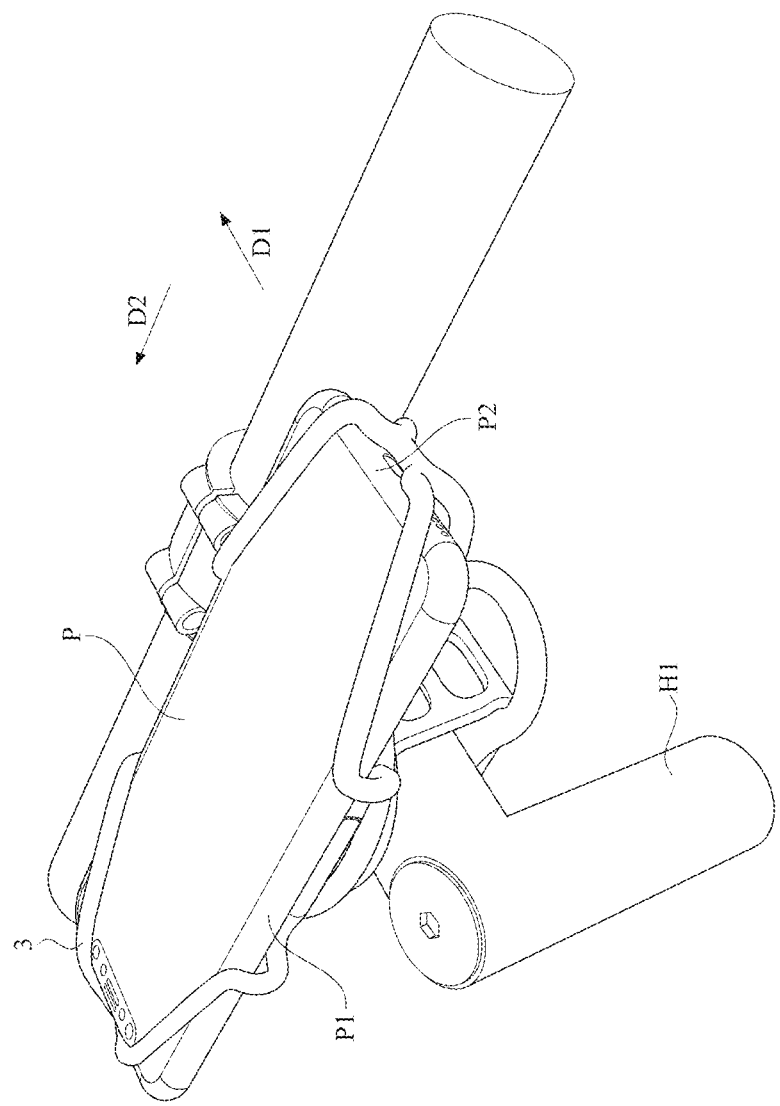
FIG. 25 demonstrates schematically another assembly state of FIG. 24.

Finally, refer to FIG. 22 through FIG. 25; where FIG. 22 is a schematic exploded view of the protective cover having replaceable male parts in accordance with the sixth embodiment, FIG. 23 is a schematic exploded view of the protective cover assembled with one of the male parts and a female part in accordance with the sixth embodiment of the present invention, FIG. 24 is a schematic perspective view of FIG. 23, and FIG. 25 demonstrates schematically another assembly state of FIG. 24. As shown, a protective cover having replaceable male parts 100e, used for covering and fixing a mobile device P selectively onto a fastener, includes a first rigid male part 1e, a second rigid male part 2e and an elastic protective-cover main body 3. The fastener 300a has a first female part 200a or a second female part 200b (labeled in FIG. 7). Further, in detail, the first female part 200a and the second female part 200b are actually the female parts PA1a, PA1b described in the background section.

The elastic protective-cover main body 3, the first engagement portions 11e and the first through holes 111e of the first rigid male part 1e, the second engagement portions 21e and the second through holes 211e of the second rigid male part 2e are all structured the same as the corresponding elements in first embodiment, and thus details thereabout are omitted herein. In addition, the first female part 200a, the fastener 300a and the foreign object H1 are all structured the same as those in the first embodiment, except for additional labeling at the first assembling component 201a of the first female part 200a in this embodiment.

In this embodiment, the first connection part 12e of the first rigid male part 1e is furnished with a plurality of first assembly holes, including two first longitudinal assembly holes 121ea, 121ec and two first horizontal assembly holes 121eb, 121ed. A first longitudinal reference line LV1 is defined to connect the two first longitudinal assembly holes 121ea, 121ec. In particular, the first longitudinal reference line LV1 is the connection line of centers of the first longitudinal assembly hole 121ea and the first longitudinal assembly hole 121ec. Thus, an extension direction of the first longitudinal assembly hole 121ea and or the first longitudinal assembly hole 121ec would be parallel to the first longitudinal reference line LV1. In addition, the first longitudinal reference line LV1 can be treated as a symmetry axis of the first longitudinal assembly hole 121ea or the first longitudinal assembly hole 121ec. Similarly, a first horizontal reference line LH1 is defined between the two first horizontal assembly holes 121eb, 121ed, and the first horizontal reference line LH1 is substantially perpendicular to the first longitudinal reference line LV1.

Similarly, the second connection part 22e of the second rigid male part 2e is furnished with a plurality of second assembly holes, including two second longitudinal assembly holes 221ea, 221ec and two second horizontal assembly holes 221eb, 221ed. A second longitudinal reference line LV2 is formed between the two second longitudinal assembly holes 221ea, 221ec, a second horizontal reference line LH2 is formed between the two second horizontal assembly holes 221eb, 221ed, and the second horizontal reference line LH2 is substantially perpendicular to the second longitudinal reference line LV2. The first rigid male part 1e and the second rigid male part 2e are two different male parts with differences in structure or dimension. In particular, the first rigid male part 1e is relevant for the first female part 200a, and the second rigid male part 2e is relevant for the second female part 200b.

The first rigid male part 1e and the second rigid male part 2e can be selectively engaged with the elastic protective-cover main body 3. In this embodiment, the first rigid male part 1e is taken for as a typical example in drawing for engaging the elastic protective-cover main body 3. After the elastic protective-cover main body 3 covers and fixes the mobile device P, then the combination of the mobile phone P and the elastic protective-cover main body 3 can be mounted together to the fastener 300a.

When the first horizontal assembly holes 121eb, 121ed of the first rigid male part 1e are assembled to the first assembling component 201a, a mounting direction of the mobile device P would be shown in FIG. 24, in which a long side P1 of the mobile device P would be parallel to a first direction D1, a wide side P2 of the mobile device P would be parallel to a second direction D2, and the first direction D1 is substantially perpendicular to the second direction D2.

In the case that the mounting direction of the mobile device P cause some unexpected troubles, or the mobile device P needs to be re-angled so as to obtain a broader display function, then the mobile device P can be rotated accordingly. Since the first rigid male part 1e is further furnished with the first longitudinal assembly holes 121ea, 121ec, thus after the mobile device P is rotated, the first rigid male part 1e would utilize the first longitudinal assembly holes 121ea, 121ec to engage the corresponding first assembling components 201a. At this time, the mounting direction of the mobile device P would be shown in FIG. 25, in which the long side P1 of the mobile device P would be parallel to the second direction D2, and the wide side P2 of the mobile device P would be parallel to the first direction D1.

Similarly, as the first rigid male part 1e is replaced by the second rigid male part 2e, and the first female part 200a is replaced by the second female part 200b, the aforesaid operation can be still obtained. Since it is proved that the conventional limitations in pairing the female part and the rigid male part can be removed by introducing the embodiments of the present invention, thus use convenience and mobility can be significantly enhanced.

In addition, in the third, fourth and fifth embodiments, the rigid male part can be one of the first rigid male part 1 or the second rigid male part 2 of the first embodiment, the first rigid male part 1a or the hidden second rigid male part of the second embodiment, and the first rigid male part 1e or the second rigid male part 2e of the sixth embodiment. Further, the protective cover kit can include the female-part carrier 42, the female-part carrier 42a and the female-part carrier 42b of the third, fourth and fifth embodiments, respectively. The universal female part 41 can be selectively assembled to the female-part carrier base 421, 421a or 421b of the female-part carrier 42, 42a or 42b, respectively.

In summary, since the protective cover having replaceable male parts provided by the present invention utilizes the first rigid male part or the second rigid male part to engage the female part of the fastener so as to detachably mount the elastic protective-cover main body to the fastener, thus, in comparison to the prior art, a relevant rigid male part can be determined to match the female part, and thereby the conventional problem of commonality in using the female part can be substantially resolved. Further, by having the first rigid male part of the present invention to be furnished with the first horizontal assembly holes and the first longitudinal assembly holes, and the second rigid male part to be furnished with the second horizontal assembly holes and the second longitudinal assembly holes, different assembly holes can be applied to match properly the assembling components of the female part, so that the mounting direction of the mobile device can be adjusted, and the use convenience can be greatly enhanced. In addition, the protective cover kit provided by the present invention utilizes the universal female part to resolve the conventional shortcoming in commonality upon the female part, such that detachable connection with any rigid male part can be feasible in accordance with the present invention.

While the present invention has been particularly shown and described with reference to a preferred embodiment, it will be understood by those skilled in the art that various changes in form and detail may be without departing from the spirit and scope of the present invention.

What is claimed is:

1. A protective cover having replaceable male parts, used for covering and fixing a mobile device, the mobile device being selectively fixed to a fastener having a first female part or a second female part different from each other, comprising:
   an elastic protective-cover main body, having a lateral slot and an opening, used for covering and fixing the mobile device, the lateral slot being larger in a longitudinal direction than the opening;
   a first rigid male part, matched with the first female part, having a first connection part and a first engagement portion, detachably engaged with the lateral slot of the elastic protective-cover main body by protruding the first connection part out of the opening; and
   a second rigid male part, matched with the second female part, having a second connection part and a second engagement portion, detachably engaged with the lateral slot of the elastic protective-cover main body by protruding the second connection part out of the opening;
   wherein, when the fastener has the first female part, the first rigid male part is selected to be engaged with the elastic protective-cover main body, so as to be used for detachably engaging the first female part;
   wherein, when the fastener has the second female part, the second rigid male part is selected to be engaged with the elastic protective-cover main body, so as to be used for detachably engaging the second female part.

2. The protective cover having replaceable male parts of claim 1, wherein the elastic protective-cover main body includes a plurality of protrusive portions disposed at the lateral slot, and the first engagement portion is furnished with a plurality of first through holes; wherein, when the first rigid male part is engaged with the elastic protective-cover main body, the plurality of first through holes are inserted by the plurality of protrusive portions.

3. The protective cover having replaceable male parts of claim 1, wherein the elastic protective-cover main body includes a plurality of protrusive portions disposed at the lateral slot, and the second engagement portion is furnished with a plurality of second through holes; wherein, when the second rigid male part is engaged with the elastic protective-cover main body, the plurality of second through holes are inserted by the plurality of protrusive portion.

4. The protective cover having replaceable male parts of claim 1, wherein the first connection part to match the first female part is furnished with a plurality of first assembly holes.

5. The protective cover having replaceable male parts of claim 4, wherein the plurality of first assembly holes include two first horizontal assembly holes and two first longitudinal assembly holes, a first horizontal reference line is formed between the two first horizontal assembly holes, a first longitudinal reference line is formed between the two first longitudinal assembly holes, and the first horizontal reference line is perpendicular to the first longitudinal reference line.

6. The protective cover having replaceable male parts of claim 1, wherein the second connection part to match the second female part is furnished with a plurality of second assembly holes.

7. The protective cover having replaceable male parts of claim 6, wherein the plurality of second assembly holes include two second horizontal assembly holes and two second longitudinal assembly holes, a second horizontal reference line is formed between the two second horizontal assembly holes, a second longitudinal reference line is formed between the two second longitudinal assembly holes, and the second horizontal reference line is perpendicular to the second longitudinal reference line.

8. The protective cover having replaceable male parts of claim 1, wherein the first engagement portion has a plurality of first barbs for preventing the opening from being enlarged by the mobile device upon when the first rigid male part is engaged with the elastic protective-cover main body while in covering the mobile device.

9. The protective cover having replaceable male parts of claim 1, wherein the second engagement portion has a plurality of second barbs for preventing the opening from being enlarged by the mobile device upon when the second rigid male part is engaged with the elastic protective-cover main body while in covering the mobile device.

10. The protective cover having replaceable male parts of claim 1, wherein, when the first rigid male part is engaged with the elastic protective-cover main body, the first connection part and the opening are fixed by structural interference.

11. The protective cover having replaceable male parts of claim 1, wherein, when the second rigid male part is engaged with the elastic protective-cover main body, the second connection part and the opening are fixed by structural interference.

12. A protective cover kit, used for covering and fixing a mobile device and for mounting the mobile device to a female-part carrier, comprising:
- an elastic protective-cover main body, used for elastically covering and fixing the mobile device;
- a rigid male part, having an engaging portion and a connecting portion, used for engaging the elastic protective-cover main body, the connecting portion being one of a first connection part and a second connection part; and
- a female-part carrier assembly, including:
    - a female-part carrier, used for defining a fixing space to detachably fix the foreign object; and
    - a universal female part, detachably connected with the female-part carrier, universally used for detachably engaging the first connection part or the second connection part of the rigid male part;
- wherein the universal female part includes a plurality of assembling components, the plurality of assembling component include a plurality of first assembling components for matching the first connection part and a plurality of second assembling components for matching the second connection part.

13. The protective cover kit of claim 12, wherein the rigid male part is engaged with the elastic protective-cover main body.

14. The protective cover kit of claim 12, wherein the female-part carrier includes a female-part carrier base, and the female-part carrier base is furnished with an accommodation room for accommodating the universal female part.

15. The protective cover kit of claim 14, wherein the female-part carrier base is further furnished with a female-part carrier engaging aperture, the female-part carrier further includes an attachment belt, the attachment belt has a first attachment layer and a second attachment layer, and the attachment belt penetrates through the female-part carrier engaging aperture to have the first attachment layer to be adhered onto the second attachment layer so as to define the fixing space.

16. The protective cover kit of claim 14, wherein the female-part carrier further includes at least one snap-in belt connected with the female-part carrier base, each of the at least one snap-in belt has at least one snap key and a plurality of snap incisions, and the at least one snap key is used for buckling at least one of the plurality of snap incisions so as to have the at least one snap-in belt to define the fixing space.

* * * * *